Feb. 28, 1961 W. E. KENNEL ET AL 2,973,350
POLYETHYLENE PRODUCTION WITH SOLID CATALYST
Filed March 11, 1954
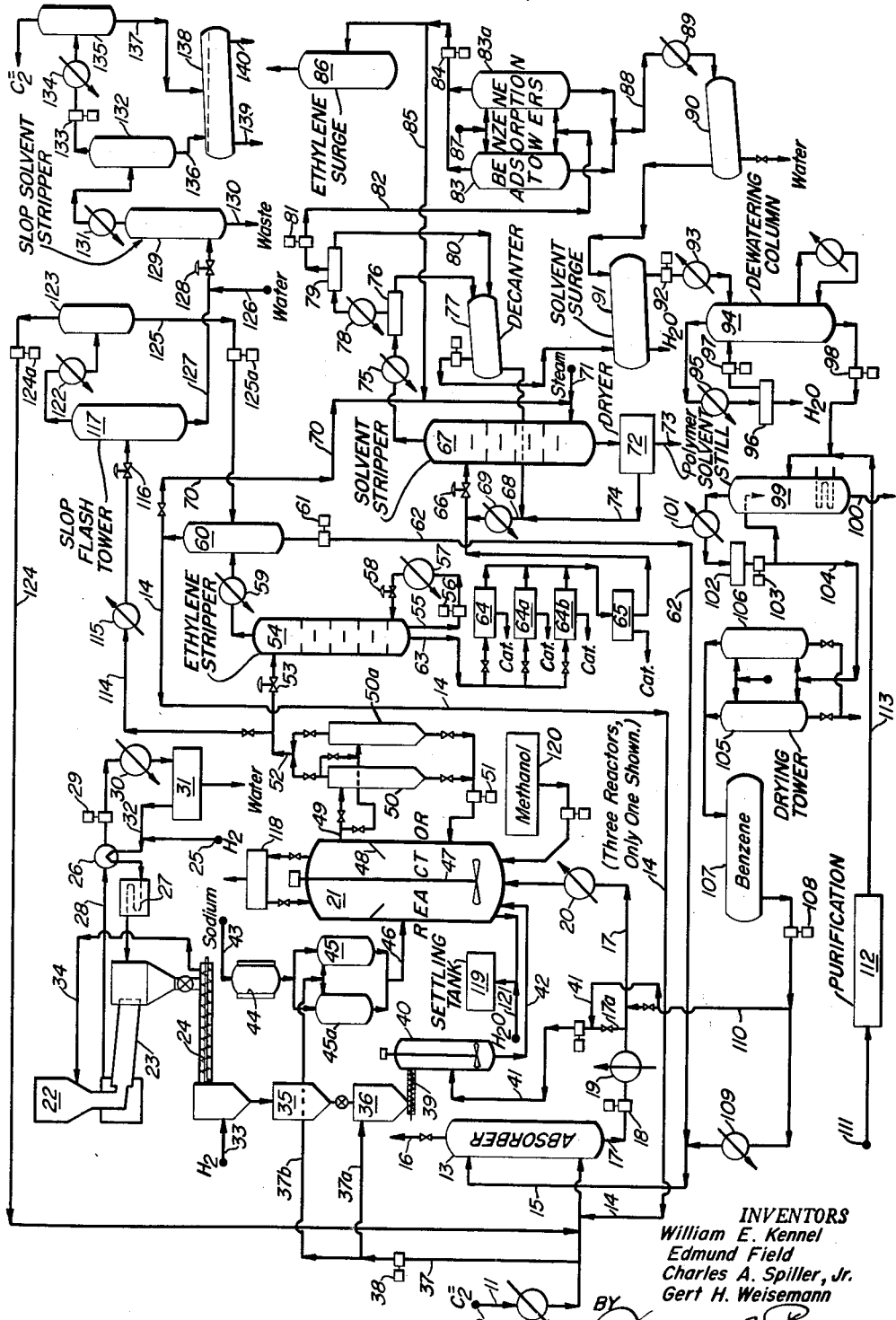
INVENTORS
William E. Kennel
Edmund Field
Charles A. Spiller, Jr.
Gert H. Weisemann
BY Donald E. Payne
ATTORNEY United States Patent Office 2,973,350
Patented Feb. 28, 1961

2,973,350
POLYETHYLENE PRODUCTION WITH SOLID CATALYST

William E. Kennel, Munster, Ind., and Edmund Field and Charles A. Spiller, Jr., Chicago, Ill., and Gert H. Weisemann, Hobart, Ind., assignors to Standard Oil Company, Chicago, Ill., a corporation of Indiana Filed Mar. 11, 1954, Ser. No. 415,564

4 Claims. (Cl. 260—94.9)

This invention relates to the production of polyethylene in a commercial system employing solid catalyst of the molybdena-on-alumina type and a promoter such as sodium. More specifically, the invention pertains to the solution of problems in carrying forward bench scale laboratory tests to commercial production.

It has been demonstrated in laboratory tests that ethylene in benzene solution can be polymerized into normally solid polymers by solid catalysts such as molybdena-on-alumina and that the polymer yield per pound of catalyst can be enormously increased by using purified charge materials and employing a promoter such as a sodium. In batch laboratory tests a bomb reactor is substantially filled with a pasty mass of catalyst and polymer and satisfactory separation of catalyst from polymer has been difficult to obtain. An object of this invention is to provide a commercial polyethylene plant design for the production of about 25,000,000 pounds per year of solid polyethylene. A further object is to provide improved methods and means for the pretreatment of materials introduced into the reaction zone coupled with improved methods and means for effecting the reaction itself and for separating catalyst, ethylene, solvent and by-product materials from polyethylene which is produced in the process. A particular object is to provide an improved method and means for transferring polymer from benzene solution to a water suspension. Another object is to provide the necessary safety factors required in commercial operations. A further object is to provide a method and means for obtaining maximum yields of high quality products at minimum investment and operating costs and with maximum flexibility of operation. Other objects will be apparent as the detailed description of the invention proceeds.

Briefly, the invention contemplates the use of ethylene which is substantially free from oxygen, moisture and oxides of carbon but may contain small amounts of other hydrocarbons such as propylene or ethane. The solvent is preferably a purified nitration grade benzene which is dried to less than 20 parts per million of water. Preferably, makeup benzene has also been purified by preliminary contact with a catalyst-promoter mixture. The catalyst is preferably a partially reduced molybdena-on-alumina which is introduced into the reactor as a slurry in benzene at the rate of about .01 to .1 percent based on introduced benzene-ethylene solution. The preferred promoter is metallic sodium which is introduced into the reactor at the rate of about .001 to .1 weight percent based on incoming benzene-ethylene solution. Other catalysts of the molybdena-on-alumina type such as group VI metal oxides on alumina, titania or zirconia may be used and other promoters such as calcium hydride and certain other hydrides may be used instead of sodium, but this does not mean that these other catalysts or promoters are equivalents of those herein described.

The reaction is effected in a stirred reactor operating at a pressure high enough to maintain liquid phase under conversion conditions, usually in the range of 500 to 20,000, e.g. 2,000 p.s.i.g., at a temperature in the range of 350 to 550° F., e.g. 465° F., at a weight space velocity in the range of about 1 to 10, e.g. about 3 parts by weight of ethylene charged per hour per part by weight of catalyst in the reactor, with a quantity of catalyst in the reactor in the range of about 2 to 20, e.g. about 6 pounds per cubic foot. The ethylene is absorbed in benzene to give a 5 to 10, preferably about 7, weight percent solution which is employed as a feed stock. In the preferred examples, the time of contact and amount of catalyst in the reaction zone is controlled to give a reactor effluent containing approximately 2 weight percent of normally solid polyethylene—this is important from the standpoint of viscosity which, in turn, is important in controlling the amount of catalyst which is withdrawn in the reactor effluent stream.

Sufficient catalyst is separated, preferably by liquid centrifugal separators, and returned to the reactor so that the amount of catalyst therein remains substantially constant and the amount of catalyst in the final reactor effluent is substantially the same as the amount of fresh catalyst being introduced to the reactor. This final reactor effluent stream is depressured to about 100 to 500, preferably about 400 p.s.i.g., and introduced into an ethylene stripper, the bottom temperature of which should not exceed about 500° F., for removing about 99 percent of the unpolymerized ethylene and about 50 to 65 percent of the benzene solvent; the removed ethylene and solvent may be recycled to the initial ethylene absorber to help supply incoming feed.

The solution leaving the base of the ethylene stripper should contain at least about 4 to 6 or 5 percent polyethylene together with the catalyst solids and the latter are separated, preferably by filtration, at a temperature in the range of 400 to 500° F. at this intermediate pressure. The catalyst-free solution is then mixed with an amount of water which will supply the heat of vaporization of the benzene and which upon depressurizing will enable the transfer of the polyethylene from the benzene to give an aqueous slurry. It is important to add the water before depressuring, i.e. while the pressure in the example is still about 400 p.s.i.a. The mixture of catalyst-free solution and water is depressurized and introduced into a solvent stripper where the benzene and a portion of the water is flashed overhead leaving a slurry of water and polyethylene, said slurry being stripped at a temperature in the range of about 140 to 190, e.g. 165° F. to remove substantially all of the benzene overhead and to leave less than 1 percent, preferably not more than 0.1 percent, of benzene in the aqueous slurry of polyethylene which is then concentrated and dried in any manner well known to those skilled in the art.

The overhead from the solvent stripper is cooled in a particular manner to effect condensation of benzene and water and benzene is recovered from the uncondensed gases by adsorption on activated carbon, the unadsorbed ethylene being discharged to a surge drum and/or recycled in the system. The condensed water which is separated from benzene is returned to the solvent stripper and the benzene layer is passed to a dewatering column for removing most of the remaining water contained therein, thence to a solvent still for removing by-products such as ethyl benzene or other alkyl benzenes and thence through a dryer for decreasing its water content preferably to not more than 10 parts per million.

Provision is made for cooling reactors in case of shutdowns, reacting metallic sodium in the reactors with methanol or the like to make it non-hazardous and to by-pass material from reactors to a "slop" system for recovering valuable components.

The invention will be more clearly understood from the following detailed description of a specific example of a commercial plant read in conjunction with the accompanying drawing which forms a part of this specification and which is a schematic flow diagram of said commercial plant.

Referring to the drawing, about 3,800 pounds per hour of ethylene from source 10 is introduced by line 11 at a pressure of about 400 p.s.i.g. and a temperature of about 4° F. The ethylene should be at least about 99 percent pure and although it may contain small amounts of ethane or propylene, it should contain less than 50 parts per million of oxygen, a moisture content corresponding to a —50° F. dew point and should be substantially free from CO and $CO_2$. The ethylene is vaporized by heat exchanger 12 and combined with recycled ethylene, and the total ethylene is introduced at the base of absorber 13 at approximately 65° F. Recycled ethylene is introduced into line 11 by line 14 at the rate of about 2,450 pounds per hour (containing about 5 to 6 percent benzene) at a temperature of about 150° F. About 156,160 pounds per hour of benzene containing about 5,600 pounds per hour of ethylene is introduced by line 15 to the upper part of the absorber tower at a temperature of about 120° F. About 20 pounds per hour of ethylene and unabsorbed material is vented from the top of the absorber by line 16. Approximately 11,420 pounds per hour of ethylene dissolved in 156,160 pounds per hour of benzene is removed from the base of the absorber by line 17, pumped by pump 18 to about 2,000 p.s.i.a., heated in exchanger 19 to a temperature of about 408° F. and thence distributed through heat exchangers 20 for close reactor temperature control to each of three reactors 21, each of which is 6 feet in diameter by 10 feet tall made of stainless or stainless clad steel and designed to withstand a reaction pressure greater than 2,000 p.s.i.a. Although only one reactor is shown in the drawing it will be understood that three of such reactors are employed in the plant.

The solid catalyst in this example is molybdena-on-alumina containing 7.5 percent molybdena and is the type of catatlyst commonly employed in the hydroforming of naphtha boiling range hydrocarbons. The particle size of the catalyst should be in the range of 10 to 100, preferably 20 to 80 mesh. Such catalyst is charged into hopper 22 and thence fed at a controlled rate into a sealed rotary kiln 23 which discharges into jacketed cooler 24. Hydrogen from source 25 is preheated in exchanger 26 and then heated in heater 27 to about 1,000° F. and introduced into the discharge end of rotary kiln 23 which may be about 1 foot, 9 inches in diameter and 30 feet long and rotated at about 1 r.p.m., the kiln being operated under a pressure of about 2 p.s.i.g. Hydrogen and moisture from the inlet end of the rotary kiln is withdrawn by line 28 through exchanger 26 and circulated by pump 29 through condenser 30 to separator 31 from which water is removed and hydrogen is recycled by line 32. The hot catalyst may be cooled in jacketed feeder 24 while in contact with a non-oxidizing gas such as hydrogen or ethylene which may be introduced by line 33 and thence transferred by line 34 to purge air from hopper 22 and to preheat the catalyst therein. The catalyst, on a dry basis, is thus charged to the system at the rate of about 45 pounds per hour and the hot hydrogen is circulated in the reduction step at the rate of about 95 pounds per hour.

The cooled partially reduced catalyst is introduced into feed hopper 35 which periodically empties into feed hopper 36, the latter being pressured by ethylene from line 37, compressor 38 and line 37a to about 2,500 p.s.i.a. to facilitate transfer of the catalyst by screw conveyer 39 into slurry tank 40 in controlled amounts. Hydrogen may be employed as a pressuring gas instead of ethylene in order to prevent any possible pre-polymerization of ethylene. The slurrying medium may be a portion of the 7 percent ethylene solution in benzene from line 17 and line 17a but it is preferably a benzene which contains little or no ethylene, e.g. benzene from line 41. Benzene slurry of about 15 pounds per hour of catalyst in 270 pounds per hour of benzene is distributed into each of the three reactors by line 42.

The promoter in this example is metallic sodium which is introduced from source 43 into dowtherm jacketed storage tank 44 at a temperature of about 240° F. Molten sodium is alternately introduced into one of the blow cases 45 and 45a and the blow case is then pressured with ethylene from line 37b to about 2,500 p.s.i.a. so that the liquid sodium may be metered by line 46 equally into each of the three reactors.

Each of the three reactors is provided with a motor driven stirrer 47 driven at 250 r.p.m. and each reactor normally contains about 1,350 pounds of catalyst and 600 pounds of sodium. The reaction temperature is held at about 465° F. by controlling the temperature of incoming feed by exchanger 20 and the reactor pressure is maintained at about 2,000 p.s.i.a. At their upper ends each of the reactors is provided with downwardly sloping annular baffles 48 the purpose of which is to provide an upper relatively quiescent settling zone so that reactor effluent withdrawn through line 49 will contain a minimum amount of solid catalyst. The conditions hereinabove described are designed to give a reactor effluent containing about 2 weight percent of solid ethylene polymer since such a solution is of proper viscosity for controlling catalyst carry-over. Charge rates, temperatures, ethylene concentration of the feed, etc. may be controlled within limits previously stated to provide a reactor effluent of the desired viscosity. While it is not always essential that the reactor effluent contain 2 weight percent of solid ethylene polymer, it should never exceed about 10 weight percent and usually should not exceed 5 weight percent, the important consideration being the viscosity and avoidance of undue catalyst carry-over.

The initial reactor effluent from each reactor may contain about 100 to 200, e.g. 150 pounds per hour of solid catalyst and in order to avoid depletion of catalyst in the reactor about 90 percent of this catalyst must be returned thereto. This is accomplished by liquid cyclones 50 and 50a which may be operated singly or in parallel to return a slurry containing about 135 pounds per hour of catalyst by pump 51 to the lower part of the reactor. The final reactor effluent, which contains about 15 pounds of catalyst from each reactor or a total of 45 pounds of catalyst per hour is withdrawn through line 52 through pressure reducing valve 53 in which the pressure is reduced to about 400 p.s.i.a. At this lower pressure the stream is introduced into the flash zone of stripper 54 which is provided with disc and doughnut baffles and which is heated at its base by withdrawing 96,500 gallons per hour of liquid through line 55 at about 470° F., pumping it to about 550 p.s.i.a. in pump 56, heating it to about 500° F. in heater 57 and reducing the pressure of the heated material in pressure reducing valve 58 in the return line. The material in the heat exchanger is at the indicated higher pressure to insure liquid phase heat exchange and prevent local overheating as polymer may degrade at temperatures above 500° F. The operation in vessel 54 effects a stripping of about 99 percent of the ethylene and about 50 to 65 percent of the benzene from the polymer solution, the overhead material being cooled in condenser 59 and separated in separator 60 so that the ethylene (containing a small amount of benzene) may be returned by line 14 to absorber 13 and the benzene (containing about 3 or 4 percent of ethylene) may be returned by pump 61 and line 62 to the top of absorber 13.

The polymer solution leaving the bottom of ethylene stripper 54 through line 63 contains about 4 to 6, preferably about 5 percent polymer together with the solid catalyst which is next removed from this system by filters 64, 64a and/or 64b; it should be understood that any known filters may be used (Sparkler filters being preferred) and that two may be operated in parallel while one is being cleaned. To insure removal of all catalyst the filtered stream may pass through an additional filter 65 before it passes through pressure reducing valve 66 into the flash zone of solvent stripper 67 which is operated at a pressure of about 2 p.s.i.g. and 165° F. A stream containing about 171,100 pounds per hour of water and about 152 pounds per hour of benzene from line 68 is heated to 200° F. in exchanger 69 and introduced into the catalyst-free stream just ahead of pressure reducing valve 66 so that on reduction of pressure the solid polymer may be transferred from a solution in benzene to a suspension in water. Most of the benzene and residual ethylene is removed from the aqueous polymer slurry in the upper flash zone of stripper 67. Ethylene from line 70 and/or steam from line 71 is introduced at the base of the solvent stripper to remove as much benzene from the aqueous slurry as is feasible so that the slurry leaving the stripper will have a benzene content substantially less than 1 percent. This slurry is then introduced to a conventional water separation and drying system 72 from which the final product polymer is removed by conveyer line 73 and water and residual benzene are returned by line 74 and line 68 to the stream entering pressure reducing valve 66.

The overhead from stripper 67 passes through cooler 75 to condensate separator 76 from which the condensate is introduced into decanter 77. Gases from separator 76 pass through refrigerated condenser 78 to separator 79 which operates at about 45° F. and condensate from 79 is introduced by line 80 to decanter 77. Uncondensed gas from separator 79 is passed by blower 81 and line 82 into one of the benzene adsorption towers 83 and 83a which are packed with activated carbon; use of refrigerated condenser-cooler 78 permits operation of adsorption towers without internal cooling area to remove heat of adsorption. The on-stream adsorber is operated at about 140° F. to adsorb benzene from ethylene which is then passed by blower 84 through line 85 to line 70 and/or to ethylene surge tank 86. The adsorber tower which is not on-stream may be regenerated by steam introduced through line 87 to remove benzene through line 88, this stream being cooled in cooler 89 and discharged into decanter 90 from which water condensate may be withdrawn. Decanted benzene from decanter 90 and decanter 77 is introduced into solvent surge tank 91 from which this benzene is passed by pump 92 and heater 93 to dewatering column 94 which may operate at a bottom temperature of 178° F. and under a pressure of .5 p.s.i.g. The overhead from this tower is condensed in condenser 95, water is withdrawn from separator 96 and benzene is recycled as reflux by pump 97.

The dewatered solvent is then introduced by pump 98 to solvent still 99 which operates at a pressure of .5 p.s.i.g. with a top temperature of 120° F. and a bottom temperature of 226° F. Alkyl benzenes such as ethyl benzene are removed from the system by line 100. The benzene is condensed in cooler 101 and that portion which is not required for reflux is introduced from receiver 102 by pump 103 through line 104 to one of the drying towers 105 and 106 which contains a suitable desiccant such, for example, as 1,500 pounds of Florite. It should be understood, however, that any other drying system may be employed which will remove the moisture content to below about 10 parts per million. The dried solvent is introduced into benzene accumulator tank 107 from which it is passed by pump 108 and heat exchanger 109 to line 15 and the upper part of absorber 13. At least a part of the benzene from this source may be introduced directly through line 110 directly to line 17 instead of to the absorber and this source of benzene is preferred for the catalyst slurrying step because it contains substantially no ethylene.

Make-up solvent is introduced to the system from source 111 and purification system 112. Nitration grade benzene is preferably employed but in order to obtain the necessary high degree of purity and to remove possible catalyst contaminants, such benzene is not only dried to the desired low water content but is preferably also contacted with catalyst and promoter in a solvent purifying tower which forms a part of purification system 112. Thus for purifying 180 pounds per hour of make-up benzene a solvent purifier may be a 6 foot tower 2 feet in diameter provided with an agitator and containing 170 pounds of molybdena-on-alumina catalyst and 34 pounds of sodium or sodium hydride, the purification being effected at a pressure of about 390 p.s.i.a. at a temperature of 350 to 400° F. It is necessary, of course, to filter the catalyst from the purified solvent before the purified solvent is introduced by line 113 to solvent still 99.

The foregoing description is applicable to normal operation of the plant. During periods of plant startup, off-grade polymer may be produced for short periods; in this case the same processing steps are followed downstream from the reactor as for normal operation except that the polymer is segregated. To take care of shutdowns and to take care of the startup of one reactor while others are on-stream without contaminating product polymer a so-called "slop" system is provided. The design of such system is on the basis that only one reactor will be shut down at any one time.

The first step in shut-down procedure after stopping ethylene flow to the reactor is to flush out residual polymer using benzene from accumulator tank 107. The flushing is carried out at about 400° F. and 400 p.s.i.a. and it may require about 1.5 hours. The benzene-polymer solution is passed by line 114 through cooler 115 and back pressure control valve 116 to slop flash tower 117. The pressure in the reactor is then reduced to 1 atmosphere by venting through a reflux condenser system 118 and returning condensed benzene to the reactor; in this way temperature is reduced to the atmospheric boiling point of benzene. A small portion of the benzene is then withdrawn from the reactor into a settling tank 119 to make room for the addition of methanol. The methanol is added from tank 120 in the amount necessary to react with all of the sodium. The hydrogen evolved is vented through the reflux condenser system 118. The amount of methanol required, about 1,000 pounds, is added over a two hour period, the heat of reaction being removed by vaporization and reflux of the benzene. After disposal of the sodium, the reactor contents are pumped into settling tank 119. A stream of water is mixed with the benzene by line 121 to extract the sodium alcoholate. After a period of settling in tank 119 the aqueous layer is dumped and the benzene is returned to make-up storage.

As above stated, slop reactor effluent, which may result when a reactor is coming on-stream or when, for some reason, it is producing off-specification polymer, is introduced into flash tower 117 which functions in a manner similar to ethylene stripper 54, the overhead being passed through cooler 122 to separator 123 from which ethylene is recycled by line 124 and compressor 124a to the base of absorber 13 and benzene is returned by line 125 and pump 125a to separator 60. Heated water at about 190° F. from line 126 is added to the polymer-benzene solution leaving the base of tower 117 through line 127, the mixture is passed through pressure reducing valve 128 and the mixture is flashed into slop solvent stripper 129 which operates at about 2 p.s.i.g. and from which the aqueous slurry of off-grade polymer is withdrawn as waste through line 130. Overhead from the slop solvent stripper is cooled to about 110° F. in exchanger 131 and introducted into separator 132. Overhead from this separator is passed by compressor 133 through refrigerated cooler 134 wherein it is cooled to a temperature of about 45° F. before being introduced into separator 135. Thus only a relatively small amount of ethylene and benzene will be vented from the top of separator 135 and most of the solvent will be introduced by lines 136 and 137, respectively, to decanter 138 from which water may be removed through line 139 and solvent by line 140 to makeup solvent storage.

From the foregoing description it will be apparent that the objects of our invention have been attained. The commercial plant hereinabove described is designed to produce polymer at the rate of about .83 pound per pound of catalyst per hour with a catalyst life of about 90 hours corresponding to about 75 pounds of polymer per pound of catalyst. The residence time in reactors when calculated on a 100 percent benzene basis is about one-fourth hour.

For over-all economy in operation it is important that solvent losses be reduced to a minimum. From the foregoing description it will be seen that this is accomplished by a combination of features including the use of refrigerated condensers 78 and 134, the use of activated carbon adsorption towers 83, the recycle of solvent-containing water through lines 68, 74 and other parts of the system and the use of the described slop recovery system.

While a specific example of the invention has been described in great detail, it should be understood that the invention is not limited thereto since alternative operations and operating conditions will be obvious from the foregoing description to those skilled in the art.

We claim:

1. In a process for polymerizing ethylene to a normally solid polymer from a solution of ethylene in benzene by means of a solid metal oxide polymerization catalyst and a promoter, the method of operation which comprises stripping about 99 percent of the ethylene and about one-third to two-thirds of the benzene from the reactor effluent at a pressure in the range of about 100 to 500 p.s.i.g. which is sufficiently high to permit recycle of benzene to an absorption step without necessity of compression, filtering residual solids from the remaining concentrated benzene solution which contains residual dissolved ethylene, adding sufficient hot water to the concentrated benzene solution while it is at a pressure in the range of 100 to 500 p.s.i.g. to supply heat of vaporization of the benzene and to provide a carrier for solid polyethylene, depressuring the mixture to substantially atmospheric pressure and stripping the liquid slurry resulting from the depressuring step, cooling the overhead from the stripping operation to a temperature obtainable by condenser water, separating uncondensed vapors from condensate thus produced and cooling the uncondensed vapors to a low temperature by a refrigerated condenser, and adsorbing benzene from uncondensed vapors separated from condensate produced by the refrigerated condenser whereby the low temperature produced by low temperature of the last named uncondensed vapors maintains the adsorbing agent at a sufficiently low temperature to provide retention of benzene without the necessity of abstracting heat from the adsorbent by indirect heat exchange.

2. The method of claim 1 which includes the further steps of recovering benzene from adsorbent by blowing steam therethrough, condensing said steam together with said steam in recovered solvent, combining the resulting condensate with condensate produced by the condenser and refrigerated condenser respectively, removing from the condensate water which separates therefrom as a separate phase, dewatering the solvent from which the water phase has been separated to obtain a solvent containing not more than 20 parts per million of water and separating from the solvent components which are higher boiling than benzene.

3. In a process for polymerizing ethylene to a normally solid polymer from a solution of ethylene in benzene by means of a solid metal oxide polymerization catalyst and a promoter, the method of operation which comprises introducing molybdena-on-alumina catalyst from a feeding zone into a reduction zone, passing hydrogen through said reduction zone at a temperature in the range of 800 to 1100° F., recycling hydrogen from the reduction zone through a cooling zone and water separation zone and heating zone back to said reduction zone, cooling the reduced catalyst with a non-oxidizing gas and introducing at least a part of said gas after the cooling step into said feeding zone for preheating the catalyst in the feeding zone and displacing air therefrom, pressuring the cooled catalyst with a non-oxidizing gas to a pressure higher than the pressure of the polymerization zone, slurrying the pressured catalyst in benzene and introducing catalyst into the reaction zone as a slurry in said benzene.

4. In a process for polymerizing ethylene to a normally solid polymer from a solution of ethylene in benzene by means of a solid metal oxide polymerization catalyst and a promoter, the method of operation which comprises effecting a reactor shut-down by displacing reactor contents with benzene, cooling the benzene in the reactor by reflux cooling during depressuring of said reactor, withdrawing a part of said benzene from the reactor to provide space for sufficient alcohol to react with sodium promoter in the reactor, introducing alcohol into the reactor to convert the sodium into sodium alcoholate and liberate hydrogen, venting hydrogen from the reactor without loss of benzene by reflux condensation and separating benzene from sodium alcoholate.

References Cited in the file of this patent

UNITED STATES PATENTS

| | | |
|---|---|---|
| 2,400,129 | Nelson | May 14, 1946 |
| 2,634,260 | Carnahan | Apr. 7, 1953 |
| 2,731,452 | Field et al. | Jan. 17, 1956 |